United States Patent Office 3,159,689
Patented Dec. 1, 1964

3,159,689
CYCLIC PROCESS FOR THE PRODUCTION OF ALPHA OLEFINS BY REACTING HALOGENOUS ORGANIC ALUMINIUM COMPOUNDS WITH OLEFINS
Karl Ziegler, 1 Kaiser Wilhelm Platz, Mulheim (Ruhr), Germany, and Roland Köster and Wolf Rainer Kroll, both of Mulheim (Ruhr), Germany; said Köster and said Kroll assignors to said Ziegler, Mulheim (Ruhr), Germany
No Drawing. Filed Mar. 15, 1960, Ser. No. 15,044
Claims priority, application Germany Mar. 17, 1959
21 Claims. (Cl. 260—683.15)

This invention relates to a cyclic process for the production of alpha olefins by reacting organic aluminum halide compounds with olefins.

The applicants have been working for many years in the field of the synthesis of higher alpha olefins. Their German Patent No. 964,642 relates to the catalytic polymerization of ethylene to produce butene, hexene and/or higher liquid or solid paraffin-like polymers, this polymerization being effected in the presence of aluminum alkyls and nickel and cobalt, preferably in a very finely divided form and especially in colloidal form.

Applicants' Germany Patent No. 1,034,169 subdivides this process into two stages. First, higher aluminum alkyl compounds are formed by allowing ethylene to add to aluminum alkyls. After an aluminum alkyl having a hydrocarbon radical of the chain length desired has been built up, nickel, cobalt or platinum is added and a low molecular weight olefin, especially ethylene, is again allowed to act upon the aluminum alkyl grown. In doing so, the ethylene or the other lower olefin displaces the higher olefin grown in form of hydrocarbon radicals bonded to aluminum, it being possible that the starting aluminum alkyl is reformed. Thus, depending upon the alpha olefin used for the displacement, the immediate reaction product of this alpha olefin synthesis was a mixture of aluminum triethyl, tripropyl and tri-n-butyl, etc. with olefins and small amounts of colloidal nickel. To permit the re-formed lower aluminum trialkyl to be successfully used in a new synthesis cycle, this mixture had to be separated into its components. This was difficult to achieve because, during the distillation in the presence of nickel, a displacement reaction takes place in which higher aluminum alkyls are again formed while ethylene or other low molecular weight olefins are split off. Therefore, the nickel had to be eliminated in any case; furthermore the removal of nickel was necessary due to the fact that otherwise a quite different course of the reaction, i.e. catalytic formation of butylene according to German Patent No. 964,642, would be observed when re-using the aluminum alkyls in the growth reaction.

A particularly great advance in alpha olefin production was involved in the process described in Belgian Patent No. 575,992 in which the production of alpha olefins by growth and displacement starts from compounds of the formula $R_2AlX$ wherein R is any hydrocarbon radical having no unsaturated bond on the carbon atoms bonded to aluminum, and X is halogen. The growth of higher alkyl aluminum halides from these starting materials is effected under the catalytic action of a compound of the formula $Al(R')_3$ which has all of the three valencies of aluminum bonded to carbon or hydrogen, and wherein R' is any hydrocarbon radical or hydrogen. It was this invention which provided the possibility for the first time to "turn on or off," so to speak, as desired the catalytic action of colloidal nickel in the displacement reaction. It was only necessary after the displacement to convert the small amounts of added or formed true aluminum trialkyl into the non-reactive type $R_2AlX$ by means of a suitable additive and then the mixture could be distilled without running the risk of a displacement.

The process of the invention operates, if desired, with mixtures of compounds of the formulae $R_2AlX$ and $AlR'_3$, but in amounts of a similar order of magnitude. Moreover, it makes use of a further observation made by the applicant.

The applicants' Germany Patent No. 961,537 discloses complex compounds of the formula $K[AlR_2X_2]$ which, when heated under vacuum, can be split into potassium halides and dialkyl aluminum halides (page 3, lines 81–100 of the patent). In the meantime, the applicant found that this disclosure is not correct in so far as more complicated conditions are prevailing in this cleavage and that a distillate consisting of a compound $R_2AlX$ and a compound $AlR_3$, and a residue consisting of potassium halide and its complex compounds with the compound $RAlX_2$ are obtained.

By combining all of his above-mentioned previous works, the applicant invented a particularly advantageous cyclic process for the production of alpha olefins. This process which starts with a complex compound of a potassium halide with a compound $R_2AlX$ of the formula $K[AlR_2X_2]$ comprises thermally splitting, preferably under vacuum, this compound to form a distillate consisting of a compound $R_2AlX$ and a compound $AlR_3$, and a distillation residue consisting of potassium halide and its complex compound with the compound $R_2AlX$ and, as the case may be, the compound $RAlX_2$; reacting the distillate with ethylene to grow higher aluminum halogen hydrocarbons, displacing from the latter the olefins bonded to aluminum in the form of hydrocarbon radicals, said displacement being effected by means of ethylene or alpha olefins of a different type and in the presence of nickel; mixing the displacement product with the distillation residue from the first stage; separating the nickel-containing displaced olefins from the complex compound $K[AlR_2X_2]$, and returning this complex compound into the first stage. For this cyclic process, R in the compound $R_2AlX$ is an alkyl radical or, if desired, a substituted alkyl radical having at least two carbon atoms and containing no unsaturated bond and no branching on the carbon atoms bonded to aluminum. Thus, R may be any alkyl and also an alkyl which is substituted with aryl or a cycloalkyl radical, e.g. vinyl cyclohexyl.

In starting this cyclic process or to provide for the required supply of the complex compound $K[AlR_2X_2]$, this compound may be prepared directly from the dialkyl aluminium halides desired and potassium halides or, alternatively, one may first start with a lower molecular weight compound $R_2AlX$, react the same with ethylene in the presence of aluminium compounds of the formula $AlR_3$ to build up higher compounds of the formula $R'_2AlX$ wherein R' is a hydrocarbon radical higher than R, displace from this synthesized aluminium halogen hydrocarbon the olefins bonded to aluminium in form of hydrocarbon radicals, said displacement being effected by means of ethylene or other, preferably low molecular weight alpha olefins in the presence of nickel, and mix this product with potassium halide and the compound $RAlX_2$, following which the cyclic process may be started.

The potassium halides used are potassium chloride or potassium bromide. Potassium iodide and potassium fluoride are not suited for the process. It is essential for the further operational steps that the melting points of the complex compounds $K[AlR_2X_2]$ are as low as is possible and that the melts can be easily supercooled. The melting points of the complex compounds $K[Al(C_3H_7)_2Cl_2]$ and $K[Al(C_4H_9)_2Cl_2]$ are rather low. Moreover, melts of these complex compounds are readily supercooled. Therefore, when using propylene or butylene in the displacement, the formation of liquid layers of the complex compound offers no difficulty at all. On the other hand, the melting point of the particularly important complex compound $K[Al(C_2H_5)_2Cl_2]$ is higher, being about 60° C. This complex compound is highly apt to crystallize, which may give rise to difficulties in the process. The melting point of the potassium chloride complex may, however, be largely depressed by admixing it with the corresponding potassium bromide complex. In addition to the uniform complex compounds $K[Al(C_2H_5)_2Cl_2]$ and $K[Al(C_2H_5)_2Br_2]$ there exists a uniform mixed complex $K[Al(C_2H_5)_2ClBr]$ which is liquid at temperatures as low as room temperature. It is unnecessary, however, to proceed to this point, it being sufficient to replace part of the potassium chloride by potassium bromide to achieve a considerable depression of the melting point of the pure potassium chloride complex.

The cleavage of the complex compound is preferably effected under vacuum at temperatures of 160° to 200° C. In this reaction, aluminum trialkyls and dialkyl aluminum halides distil while potassium halide and its complex compounds are left in the residue. Thus, the cleavage of the starting complex compound provides the possibility of convering the pure $R_2AlX$ type of compound which is completely inactive in the sense of the growth and displacement reaction into its mixture with the fully reactive aluminum trialkyl. In the presence of so much aluminum trialkyl, the dialkyl aluminum halide co-reacts in the sense of the process of Belgian Patent No. 575,992 in both the growth and the displacement. This is achieved by a very simple treatment under vacuum in the presence of heat without a loss of organo-aluminum material, the compounds necessary for the subsequent inactivation of the aluminum trialkyl being available in exactly equivalent amounts in the residue from the distillation.

The cleavage of the potassium halide complex compound needs not be brought to completion, it being more advantageous for operational reasons to carry the cleavage of the complex compound only to the point where the residue consisting of potassium halide and complex potassium compound still represents a slurry which is readily mobile in the heated state. The mechanical properties of the residues remaining after the cleavage, especially if the complex compound $K[Al(C_2H_5)Cl_3]$ is present, become more and more disadvantageous as the degree of cleavage increases because the melting point of this complex compound is in the high range. Therefore, at the end of the cleavage, there is obtained a very dense cake of potassium chloride and this complex compound, which is very difficult to handle and which must be heated for extended periods of time at rather high temperatures for extracting the last portions of distillate, which treatment is accompanied by decomposition and losses. It is true that the conditions are more favorable in other systems with propyl and butyl radicals or with bromine instead of chlorine. However, here again, the use of a partial cleavage is more advantageous. In this case, the distillation residue will, of course, contain a certain amount of the uncleaved starting complex in addition to the cleavage products. This is unimportant, however, since the entire process is carried out as a cyclic operation. This fact needs only be taken into consideration in such a manner that $2nX$ parts of the complex must be charged to the cleavage for obtaining X parts of the uncomplexed aluminum compounds of the distillate obtained in the cleavage, the preferred value of the coefficient $n$ varying from one complex to the other.

The distillate is synthesized in a manner known per se using temperatures of between 90° and 150° C. and preferred pressures of about 100 atmospheres in accordance with German Patent No. 1,034,169. Following this, the synthesis product is subjected to displacement with ethylene or other, preferably lower alpha olefins, this displacement being likewise effected in accordance with German Patent No. 1,034,169 in the presence of nickel, cobalt or platinum. The displacement product is then mixed with the total distillation residue of the first stage. In doing so, the aluminum trialkyl present is inactivated with reformation of dialkyl aluminum chloride and formation of the potassium chloride complex of the monochloride. Thus, in an ideal case, a mixture of the displaced alpha olefins and the complex compound $K[AlR_2X_2]$ is formed, which mixture needs only be separated whereupon the complex compound may be returned into the first stage. In practice, especially in cases where the displacement stage and the step of mixing the displacement product with the distillation residue are completely or partially interchanged, mixtures of different potassium halide complex compounds with potassium halide are obtained. Both of these stages may be completely exchanged by admixing the synthesis product with the distillation residue, adding nickel salt and some aluminum trialkyl to the mixture and only then carrying out the displacement step. A still more advantageous procedure comprises adding only part of the distillation residue and the nickel salt to the synthesis product, then carrying out the displacement and, finally, adding the remainder of the distillation residue. The advantage of this mode of operation consists in that the separation into two layers will start as early as during the displacement. While this is not very important, though not detrimental when displacing with ethylene, it is rather essential in the displacement with propylene and butylene. In these cases, no difference at all in affinity between the displacing olefin and the olefin to be split off (this difference in affinity being very great in case of ethylene) exists, and, therefore, an extensive displacement of higher olefins can be achieved only with great excesses of propylene and butylene, respectively. Under these conditions, the course of the reaction in the desired direction is improved if one of the reaction products is removed from the equilibrium during the reaction by separation as a second phase. If the potassium chloride contained in the distillation residue is not to be carried per se through the displacement stage, the pure complex compound $K[AlRX_3]$ may be extracted from the distillation residue by means of a suitable solvent such as an aromatic hydrocarbon, e.g. benzene. Upon separation of the solvent, this compound may then be subjected to the displacement separately and the residue from the extraction may be added to the displacement product.

It is of greatest importance to the economy of the process that the separation of the potassium halide complex compounds formed in mixing the displacement product with the distillation residue, and, as the case may be, of the potassium halide itself from the displaced olefins be as complete as is possible. It is particularly essential, therefore, that the product obtained separates into layers spontaneously with the lower layer consisting of the complex compound $K[AlR_2X_2]$ and the upper layer of the nickel-containing displaced olefin. When operating at temperatures at which the lower layer is molten, e.g. at temperatures in excess of 60° C. in the presence of the complex compound $K[Al(C_2H_5)_2Cl_2]$, the complex compound remains in molten state and may be drained at the bottom. Alternatively, cooling may be effected upon complete separation of the layers until the lower layer solidifies and the upper olefin layer may be poured off. Finally, it is possible after complete separation of the layers to distil off the upper layer consisting of the nickel-containing displaced olefin.

When operating with ethyl-containing complex compounds, a different route may be taken for separating the olefins from the complex compounds, i.e. allowing the stirred mixture of the distillation residue of the first stage and the displacement product to cool thereby precipitating the compound $K[Al(C_2H_5)_2Cl_2]$ as a crystalline slurry which is separated from the olefins under exclusion of air.

Among the factors which are of decisive importance to the economy of the process is the question of to what extent the separation of olefins and complex compounds can be achieved, especially by stratification, i.e. to what extent layers which are completely insoluble in each other are formed in the separation or to what extent the two layers are soluble in each other. If substantial amounts of the aluminum halide catalysts are left in the olefin layer, this will unfavorably influence the completeness of the recovery of the halogenous catalysts, or it will be necessary to recover the catalyst portions from the distillation residue of the olefins. It has been found that the conditions are very favorable where the halogen contents of the olefin layer are in the order of magnitude of below 1%. Surprisingly, this separation will be as complete even if hexene or octene are charged to the displacement stage and complex compounds of the corresponding higher aluminum alkyl halides are contained in the lower layer. During the distillation of the olefins, these small amounts of complex compounds will remain in the nickel-containing residue and may be recovered. When processing the olefins by distillation, the nickel will remain in the residue.

Only very small amounts of nickel enter the lower layer composed of the complex compounds. This does not represent a disadavntage, however, since the organo-aluminum compounds used for the synthesis are obtained during the distillation of the cleaved complex compound. Thus, any trace of nickel entrained to this point is left in the residue. Here, the nickel may safely be allowed to accumulate as it does not give rise to any difficulties irrespective of whether the residue is added to the growth product or to the displacement product. The liquid lower layers of the complex compounds contain only small amounts of olefins. If these are likewise desired to be recovered from the complex compound, it is only necessary to extract the complex compounds with saturated aliphatic hydrocarbons such as pentane or hexane after separation, of course, of the olefins thereby removing even the last traces of olefins from the complex compounds. These paraffins are very easily distilled off if small amounts thereof have entered the complex compound.

*Example 1*

148.5 kilograms of dipropyl aluminum chloride and 74.5 kilograms of potassium chloride which had previously been thoroughly dried by heating to 400° C. in a muffle furnace are introduced with stirring into a vacuum-tight stirring vessel first filled with nitrogen and heated to 120° C. Vacuum is then applied and the temperature in the outer heating jacket of the stirring vessel is increased to 180° C. The distillation is discontinued when 72 kilograms of distillate have been obtained and the residue is allowed to cool in the stirring vessel. This residue remains easily stirrable up to a temperature of 60° C. It is first filled into a heatable storage vessel and put aside for subsequent use within the process described herein. The residue consists of a mixture of the two complex compounds $K[Al(C_3H_7)_2Cl_2]$ and $K[Al(C_3H_7)Cl_3]$ with potassium chloride suspended therein. The distillate has a chlorine content of 9.1% and consists of a mixture of 38% dipropyl aluminum monochloride and 62% aluminum tripropyl. 70 kgs. of this distillate are charged to the top of a pressure-resistant reaction tower and 2 kgs. are put aside. A temperature of 100 to 110° C. is maintained in the tower. The reactor is packed with Raschig rings of copper and an ethylene pressure of 100 atmospheres is maintained in its interior. The liquid reaction product flowing off at the bottom is repeatedly returned to the top of the tower by means of a pressure pump and analyzed afer each passage. The halogen and aluminum contents are gradually decreased by the addition of ethylene. Additional control of the course of the reaction is provided by the weight of the reaction product flowing off at the tower bottom if the tower is completely drained from time to time and the entire reaction product is withdrawn at the bottom.

Varying quantities of ethylene are added depending upon the molecular size of the subsequent final reaction products. A commercially satisfactory olefin mixture containing all of the olefins having odd carbon numbers from $C_5$ through about $C_{19}$ is obtained as the finished product if the addition of ethylene is carried to a point where a total of 192 kgs. of liquid having a chlorine content of 4% has been obtained from the initially charged 70 kgs. of chloride-containing aluminum tripropyl.

To these 192 kgs. of liquid product which must be thoroughly protected from access of air there is now added a nickel catalyst which had been prepared as follows: 100 grams of finely pulverized nickel acetyl acetonate are suspended in 500 ml. of hexane and the suspension is then allowed to flow into half of the above-mentioned 2 kgs. of distillate put aside, this addition being effected with exclusion of air and while stirring and cooling. A deep black solution or suspension is formed. The higher organo aluminum compounds thus mixed with nickel are now pumped into a pressure vessel which contains 700 kgs. of dry and oxygen-free propylene. Re-formation of aluminum propyl compounds from the organo-aluminum compound now takes place with liberation of higher alpha olefins. This process takes about 1 to 2 hours. It is promoted by stirring and gentle heating of the pressure vessel to about 30° C. The progress of the reaction may be followed by withdrawing small samples under nitrogen into containers which are cooled to −80° C., rapidly removing the propylene at as low a temperature as is possible while applying vacuum, and then decomposing the residue with methanol. In doing so, propane is evolved which is collected. The ratio of propane to titratable aluminum equivalents should then be as close as possible to unity. By the term "titratable" aluminum equivalents is understood that quantity which can be directly titrated by the method of O. Glemser and L. Thelen, Z. angew. Chem., 62, 269 (1950), i.e. it is that portion of aluminum which was not initially bonded to chlorine. When samples are repeatedly drawn from the beginning during this operation, it is found that this ratio varies from sample to sample and finally approaches unity.

After this step of the reaction has proceeded to completion, the re-liquefied residue from the first thermal cleavage of the complex compound is pumped in to the possible and the mixture is thoroughly stirred. Withdrawal of propylene from the vessel may already be started during this operation. It is again liquefied and placed into a storage vessel for subsequent re-use. Upon complete evaporation of the propylene, the reaction vessel contains two immiscible liquids which separate on stopping the agitator. The lower layer consists of practically pure potassium aluminum dipropyl dichloride which still contains a very small amount of free potassium chloride and, in addition, a little potassium aluminum propyl trichloride as equivalents for the quantity of distillate rich in aluminum tripropyl withdrawn during the process and incompletely made up for.

It is not absolutely necessary but very desirable that the composition of the lower liquid phase be adjusted as described above because this will provide substantial assurance that no free aluminum trialkyl is still contained in the mixture in this phase of the run.

The lower layer is withdrawn from the reaction vessel with continued exclusion of air and is preferably immediately returned into the stirring vessel mentioned in the beginning of this example to effect the thermal cleavage. Having done this, the cleavage for the next reaction cycle may be carried out immediately. In the first repetition, the withdrawal of the small amount of 2 kgs. of the halogen-containing aluminum tripropyl has to be omitted. And beginning with the first repetition, the nickel catalyst is to be prepared with the use of only 100 grams of fresh aluminum tripropyl.

The upper olefin layer is colored dark by colloidal nickel and is freed from the nickel by distillation. Removal of the higher boiling portions by distillation is effected under vacuum. The nickel remains in the residue, may be collected and subsequently processed to form nickel acetyl acetonate. The composition of the olefin layer in an experiment carried out in accordance with this example is as follows:

|  | Wt. percent |
|---|---|
| $C_4$ | 2.1 |
| $C_5$ | 5.6 |
| $C_6$ | 2.4 |
| $C_7$ | 14.1 |
| $C_8$ | 1.9 |
| $C_9$ | 21.2 |
| $C_{10}$ | 0.3 |
| $C_{11}$ | 19.8 |
| $C_{13}$ | 15.1 |
| $C_{15}$ | 9.2 |
| $C_{17}$ | 5.2 |
| $C_{19}$ | 2.8 |

The presence of small amounts of olefins having even numbers of carbon atoms in the reaction product is due to the fact that aluminum propyl is converted to aluminum ethyl to a minor extent by the so-called displacement reaction during the synthesis of the higher aluminum alkyls in the pressure reaction tower, and this aluminum ethyl in turn gives rise to the higher aluminum alkyls having even numbers of carbon atoms.

*Example 2*

The procedure is exactly the same as in Example 1 except that 1000 kgs. of alpha butylene are used in place of propylene in the second reaction phase after the addition of nickel. At the end of the experiment, the olefin layer has the same composition as in Example 1 while the complex compound $K[Al(C_4H_9)_2Cl_2]$ is obtained as the lower layer. This complex compound likewise is liquid at temperatures as low as room temperature. When it is heated to 180–200° C. under a vacuum of 0.1 mm. Hg, there is obtained a distillate of which 70% are aluminum tributyl and which may then be used to build up higher aluminum alkyls by addition of ethylene and, thereafter, to produce even-numbered alpha olefins. It is possible in this manner to pass over from the synthesis of odd-numbered alpha olefins to the synthesis of even-numbered olefins. Of course, the reverse is possible at any time by first introducing into the pressure reaction tower an aluminum compound with straight-chain radicals and treating it in the second reaction stage with propylene, n-pentene or n-heptene.

*Example 3*

By the procedure described in the beginning of Example 1, 284 kgs. of potassium aluminum diethyl dibromide are first heated under vacuum until 141 kgs. of distillate have passed over. The distillate contains 8.9% of bromine and consists of 90% diethyl aluminum bromide and 10% aluminum triethyl. The residue of this vacuum cleavage is simply left in the stirring vessel. The distillate is subjected to the growth reaction with ethylene at a pressure of 100 atmospheres and at a temperature of 150° C. in the pressure reaction tower by the procedure of Example 1 until it has increased in weight by 700 grams per kilogram. To this mixture is added a nickel catalyst prepared from 500 ml. of hexane, 80 grams of nickel acetyl acetonate, 80 grams of aluminum triethyl and the resulting nickel-containing organo-aluminum compound is again pumped to the top of the reaction tower, the temperature now being 50–60° C. and the ethylene pressure 50 atmospheres. Control of the progress of the reaction is possible by hydrolyzing small amounts of the liquid withdrawn at the bottom and measuring the quantity of gas evolved. The gas must consist of substantially pure ethane and, moreover, 1 equivalent of ethane must be formed per equivalent of titratable aluminum. Upon reaching this point, this operation may be terminated. The mixture now present of olefins and diethyl aluminum bromide and little aluminum triethyl is returned into the reaction vessel in which the cleavage of the complex potassium aluminum diethyl dibromide had been effected initially, and is heated therein to 40–50° C. while stirring. Here again, separation into two layers occurs and the further treatment is analogous to that of Example 1. The composition of the olefins obtained is as follows:

|  | $C_4$ | $C_6$ | $C_8$ | $C_{10}$ | $C_{12}$ |
|---|---|---|---|---|---|
| Wt. Percent | 37.0 | 33.5 | 21.8 | 6.1 | 1.3 |

The complex compound obtained may again be cleaved under vacuum without further treatment as described in the beginning of this example.

*Example 4*

In a vacuum stirring vessel as described in Example 1, 120.5 kgs. of diethyl aluminum monochloride are mixed with 37.25 kgs. of potassium chloride and 59.5 kgs. of potassium bromide, both of which salts had previously been thoroughly dried, and the mixture is stirred at 120° C. until a homogenous liquid has formed. The distillation is effected at a bath temperature of 160° C. and under a vacuum of 3 mm. Hg until 70 kgs. of distillate are collected. The residue in the stirring vessel is allowed to solidify while stirring. In doing so, the residue assumes a loose and still flowable form. The distillate contains 18.5% of chlorine and 2.8% of bromine and consists of 27% aluminum triethyl and 73% aluminum diethyl monochloride and diethyl aluminum monobromide. In carrying out this operation for the first time, 2 kgs. are withdrawn from the distillate and the balance of 68 kgs. is introduced into the pressure reaction tower mentioned in Example 1 to be reacted with ethylene. The growth reaction with ethylene is carried out until an increase in weight to 180 kgs. has occurred. This is followed again by activation with colloidal nickel and treatment with ethylene at 50 atmospheres in the pressure reaction tower as described in Example 3. The mixture thus obtained of re-formed ethyl aluminum compound and olefins is returned into the stirring vessel initially used for the cleavage and the further steps are as described in Example 3.

*Example 5*

The initial steps in this experiment are the same as those of Example 1 up to and including the production of the higher aluminum alkyl by reaction with ethylene at 100 atmospheres in the pressure reaction tower (prior to the addition of nickel). In this case, however, the withdrawal of 2 kgs. of the distillate initially obtained in the cleavage is omitted. The higher alkyl is charged into a larger pressure vessel and contacted therein with nine tenths of the residue initially obtained in the cleavage of the complex compound under vacuum. This results in the formation of a mixture which for the most part consists of dialkyl aluminum chloride with odd-numbered higher alkyls and, moreover, of the corresponding aluminum trialkyls. Activation is effected with a nickel catalyst comprising 500 ml. of hexane, 100 gms. of Ni-acetyl acetone and 100 gms. of Al-tri-propyl and the further steps effected with the addition of 300 kgs. of propylene are as described in Example 2. Replacement of the longer alkyl radicals having odd numbers of carbon atoms with propyl groups now takes place with liberation of the olefins having odd numbers of carbon atoms, and the liquid simultaneously separates into layers because the complex compound of dipropyl aluminum chloride with potassium chloride is able to form. This separation into layers during the reaction with propylene offers advantages because the reaction with propylene is more complete. Therefore, in this phase of the reaction, the quantity of propylene can be reduced to 50% of that used in Example 2. After about two hours, the last tenth of the cleavage residue initially obtained is added and now the entire reaction mixture may be further processed as described in Example 2.

*Example 6*

A mixture of 241 gms. of diethyl aluminum monochloride and 114 gms. of aluminum triethyl is shaken at 125° C. in an autoclave maintained under an ethylene pressure of 100 atmospheres. A steel cylinder containing ethylene is connected to the autoclave and the reaction is terminated after the mixture has absorbed a total of 400 gms. of ethylene. The excess pressure is released and now a nickel catalyst prepared from 150 gms. of nickel acetyl acetonate and 120 gms. of aluminum triethyl is introduced into the autoclave. Then ethylene is introduced under pressure until a pressure of 40 atmospheres is reached and the autoclave is heated to about 50° C. until ethylene is no longer taken up. The ethylene pressure is now released and the liquid contents of the autoclave are discharged under exclusion of air. Then 135 gms. of ethyl aluminum dichloride and 320 gms. of potassium chloride are added and the mixture is stirred at 100° C. thereby rapidly distilling off part of the olefins (hexene and perhaps octene). Three possibilities are available for the further processing:

(a) The mixture is allowed to cool further thereby precipitating the complex compound $K[Al(C_2H_5)_2Cl_2]$ as a crystal slurry which may be separated from the olefins by filtration with exclusion of air.

(b) The temperature is maintained sufficiently high that the complex compound remains in molten state and the lower layer is drained in molten state.

(c) The product is allowed to cool after complete separation into layers until the lower layer is solidified into a dense mass and the olefins are simply decanted.

In any case, the olefins are then further processed by distillation in conventional manner. The solid complex compound (780 grams) may then be cleaved under vacuum for the repetition of the experiment in accordance with Example 4. Further processing is again effected by the procedures just described. Of course, in this case, the addition of monoethyl aluminum dichloride and of potassium chloride is omitted because these quantities are now introduced into the reaction product with the residue from the cleavage.

What we claim is:

1. A cyclic process for the production of an alpha olefin by reacting an organic aluminum halide compound of the general formula $R_2AlX$ wherein R represents an alkyl radical having at least two carbon atoms and containing no unsaturated bond and no branching on the carbon atoms bonded to aluminum and X is a member selected from the group consisting of chlorine and bromine, with an olefin in the present of an aluminum compound of the general formula

wherein R' is a straight chain aliphatic radical, which comprises the steps of (1) thermally cleaving a complex compound of a potassium halide selected from the group consisting of potassium chloride and potassium bromide with a compound $R_2AlX$ having the formula $K[AlR_2X_2]$ wherein R is as above defined to form a reaction product consisting of a distillate consisting of the compounds $R_2AlX$ and $AlR_3$ and a distillation residue consisting of a potassium halide as above defined and its complex compound, with at least one of the compounds selected from the group consisting of $R_2AlX$ and $RAlX_2$; (2) contacting the said distillate with ethylene at a temperature between 90° and 150° C. and under an elevated pressure to form by addition a higher aluminum hydrocarbon; (3) treating the resulting addition product with a member selected from the group consisting of ethylene and alpha olefins in the presence of nickel to thereby split off as olefin the hydrocarbon radicals bonded to the aluminum, the split olefin produced on the aluminum by addition being simultaneously displaced by the olefin employed in the contacting; (4) admixing the reaction product thereby formed with the distillation residue formed in step 1; (5) separating the nickel-containing split-off olefin from said complex compound $K[AlR_2X_2]$, and re-cycling said complex compound to the first step.

2. The process as claimed in claim 1, wherein said thermal cleavage is effected at a temperature within the range of 160–200° C.

3. The process as claimed in claim 1, wherein R in said organic aluminum compound $R_2AlX$ is an alkyl radical substituted with a member selected from the group consisting of alkyl, cycloalkyl, aryl, alkenyl, and cycloalkenyl.

4. The process as claimed in claim 1, wherein said cleavage of said potassium halide complex compound is carried to the point where the residue of potassium halide and aluminum complex compound represents a slurry which is readily mobile in the heated state.

5. The process as claimed in claim 1, wherein said thermal cleavage is promoted by vacuum.

6. The process as claimed in claim 1, wherein said mixture of said distillation residue of the first step and the displacement product are separated by stratification in the presence of heat, the upper layer consisting of the nickel-containing displaced olefin and the lower of the complex compound $K[AlR_2X_2]$.

7. The process as claimed in claim 6, wherein the lower layer additionally contains potassium chloride.

8. The process as claimed in claim 6, wherein the molten lower layer is drained.

9. The process as claimed in claim 6, wherein cooling is effected upon complete separation into layers until the lower layer solidifies, and the upper olefin layer is decanted.

10. The process as claimed in claim 6, wherein the upper layer consisting of the nickel-containing displaced olefin is distilled off after separation into layers.

11. The process as claimed in claim 1, wherein when said complex compound is an ethyl-containing complex compound the mixture of said distillation residue of the first step and the displacement product is allowed to cool with stirring thereby precipitating the compound $K[Al(C_2H_5)_2Cl_2]$ as a crystal slurry which is separated from the olefin by filtration with exclusion of air.

12. The process as claimed in claim 1, wherein the aluminum-organic complex compound obtained in the last step is extracted with a saturated aliphatic hydrocarbon to remove last traces of olefin prior to being split again.

13. The process as claimed in claim 12, wherein said saturated hydrocarbon is a compound selected from the group consisting of pentane and hexane.

14. The process as claimed in claim 1, wherein in starting the cyclic process and to replenish its requirements of the complex compound $K[AlR_2X_2]$ this complex compound is produced from a dialkyl aluminum halide and a potassium halide with heating.

15. The process as claimed in claim 14, wherein said complex compound is subsequently split by increasing the temperature and applying vacuum.

16. The process as claimed in claim 1, which comprises first reacting a compound of the formula $R_2AlX$ with ethylene in the presence of an aluminum compound of the formula

to form by addition a higher compound of the formula $R'_2AlX$ wherein R' is a hydrocarbon radical higher than R; displacing from this synthesized aluminum halogen hydrocarbon by means of an olefin and in the presence of nickel the olefin bonded to aluminum in the form of hydrocarbon radicals; mixing the product with potassium halide and the compound $RAlX_2$ and only then carrying out the cyclic process.

17. The process as claimed in claim 16, wherein said olefin is a member of the group consisting of ethylene and alpha olefins.

18. The process as claimed in claim 17, wherein said alpha olefin is a low molecular weight alpha olefin.

19. A cyclic process for the production of an alpha olefin by reacting an organic aluminum halide compound of the general formula $R_2AlX$ wherein R represents an alkyl radical having at least two carbon atoms and containing no unsaturated bond and no branching on the carbon atoms bonded to aluminum and X is a member selected from the group consisting of chlorine and bromine, with an olefin in the presence of an aluminum compound of the general formula

wherein R' is a straight chain aliphatic radical, which comprises the steps of (1) thermally cleaving a complex compound of a potassium halide selected from the group consisting of potassium chloride and potassium bromide with a compound $R_2AlX$ having the formula $K[AlR_2X_2]$ wherein R is as above defined to form a reaction product consisting of a distillate consisting of the compounds $R_2AlX$ and $AlR_3$ and a distillation residue consisting of a potassium halide as above defined and its complex compound, with at least one of the compounds selected from the group consisting of $R_2AlX$ and $RAlX_2$; (2) contacting the said distillate with ethylene at a temperature between 90° and 150° C. and under an elevated pressure to form by addition a higher aluminum hydrocarbon; (3) admixing the resulting addition product with the distillation residue obtained in the first step; (4) treating the resulting mixture with a member selected from the group consisting of ethylene and alpha olefins in the presence of nickel to thereby split off as olefin the hydrocarbon radicals bonded to the aluminum, the split olefin produced on the aluminum by addition being simultaneously displaced by the olefin employed in the contacting; (5) separating the nickel-containing split-off olefin from said complex compound $K[AlR_2X_2]$, and re-cycling said complex compound to the first step.

20. The process as claimed in claim 19, which comprises additionally admixing with said addition product and distillation residue a nickel salt and $AlR_3$ prior to carrying out said splitting-off step.

21. The process as claimed in claim 19, which comprises admixing only a part of the said distillation residue with said addition product and admixing the balance of said distillation residue with the product formed in said splitting-off step.

References Cited in the file of this patent
UNITED STATES PATENTS

| | | |
|---|---|---|
| 2,220,930 | Kraus | Nov. 12, 1940 |
| 2,781,410 | Ziegler et al. | Feb. 12, 1957 |

FOREIGN PATENTS

| | | |
|---|---|---|
| 961,537 | Germany | Apr. 11, 1957 |